United States Patent
Sanada et al.

(10) Patent No.: US 6,700,851 B1
(45) Date of Patent: Mar. 2, 2004

(54) DISK CARTRIDGE DEVICE FOR UNIVERSALLY MOUNTING AND POSITIONING DISK CARTRIDGES HAVING DISKS OF DIFFERENT SIZE DIAMETERS

(75) Inventors: Yotaro Sanada, Tokyo (JP); Yoshio Kusui, Kanagawa (JP); Naohiro Netsu, Tokyo (JP)

(73) Assignee: Sony Corporation (JP)

( * ) Notice: Subject to any disclaimer, the term of this patent is extended or adjusted under 35 U.S.C. 154(b) by 313 days.

(21) Appl. No.: 09/711,266

(22) Filed: Nov. 9, 2000

(30) Foreign Application Priority Data

Nov. 12, 1999 (JP) .......................... P11-323227

(51) Int. Cl.$^7$ .......................... G11B 23/03; G11B 33/02
(52) U.S. Cl. .................. 369/77.2; 369/291; 360/133
(58) Field of Search ................ 369/291, 77.2; 206/308.1; 360/133

(56) References Cited

U.S. PATENT DOCUMENTS

| | | | | |
|---|---|---|---|---|
| 5,091,815 A | * | 2/1992 | Suzuki | .................... 360/133 |
| 5,812,511 A | | 9/1998 | Kawamura et al. | ........ 369/77.2 |
| 6,307,712 B1 | * | 10/2001 | Meguro et al. | ............. 360/133 |

FOREIGN PATENT DOCUMENTS

| | | |
|---|---|---|
| DE | 32 02 876 A | 8/1983 |
| EP | 0 576 253 A2 | 12/1993 |
| EP | 0 779 618 A1 | 6/1997 |
| EP | 1017056 A1 * | 7/2000 ......... G11B/23/033 |
| EP | 1100085 A2 * | 5/2001 ........... G11B/17/04 |
| EP | 1100086 A2 * | 5/2001 ........... G11B/17/04 |
| EP | 1122731 A2 * | 8/2001 ........... G11B/23/03 |
| JP | 01118278 A * | 5/1989 ........... G11B/23/28 |
| JP | 8-167215 | 6/1996 |
| JP | 08 167215 | 6/1996 |
| JP | 10003774 A * | 1/1998 ........... G11B/23/28 |
| JP | 10003775 A * | 1/1998 ........... G11B/23/28 |
| JP | 11250559 A * | 9/1999 ........... G11B/19/12 |

OTHER PUBLICATIONS

European Search Report Mar. 11, 2002 and Annex.

* cited by examiner

Primary Examiner—William Klimowicz
(74) Attorney, Agent, or Firm—Rader, Fishman & Grauer PLLC; Ronald P. Kananen

(57) ABSTRACT

A disk cartridge device includes a plurality of disk cartridges with disks having different disk diameters and each being stored in cartridge housings having different sizes, a recording and reproducing device with the plurality of disk cartridges having different sizes selectively mounted, pairs of positioning pins having a base for determining the height for positioning each of the disk cartridges having different sizes onto the recording and reproducing device and positioning holes on one surface of the disk cartridges having different sizes, to be respectively engaged with the pairs of the positioning pins so as to be positioned. The position of the positioning holes of the disk cartridge having a small disk diameter is disposed outside the disk circumference of the disk cartridge having a large disk diameter.

8 Claims, 6 Drawing Sheets

DISK CARTRIDGE DEVICE FOR UNIVERSALLY MOUNTING AND POSITIONING DISK CARTRIDGES HAVING DISKS OF DIFFERENT SIZE DIAMETERS

BACKGROUND OF THE INVENTION

1. Field of the Invention

The present invention relates to a disk cartridge device for recording an information signal on a signal recording layer or reproducing an information signal recorded on a signal recording layer by radiating a light beam to the signal recording layer of, for example, an optical disk. More specifically, it relates to that of a so-called compatible system wherein a plurality of disk cartridges including disks having different disk diameters each stored in cartridge housings having different sizes are mounted selectively on a recording and reproducing device, with the disk cartridges having different sizes capable of being positioned and held by positioning pins of the recording and reproducing device without troubles.

2. Description of the Related Art

Conventionally, an optical disk as a recording medium for various kinds of information such as audio information and video information, for reproducing the information recorded on the recording medium by the use of a light beam, or recording has been proposed. Since this kind of an optical disk can be provided as a plate-like disk and thus it can be handled easily as well as it has a large recording capacity compared with a recording medium such as a magnetic tape, it is widely used as a recording medium for audio information, video information, and further for data to be processed by a computer.

In contrast, a smaller size has been required to a recording and/or reproducing device using an optical recording medium such as an optical disk in consideration of the installation space for assembly into, for example, an information processing apparatus such as a computer.

Moreover, since a recording medium, too, needs to be smaller in order to achieve a smaller size of a recording and/or reproducing device, a higher capacity of a recording medium is required as well. Therefore, a plurality of kinds of disk cartridges including disks having different disk diameters each stored in cartridge housings having different sizes were proposed as recording media, and the present inventor has proposed the disk cartridges already in the official gazette of Japanese Patent Application No. 11-176029.

Since the above-mentioned disk cartridges are of a system wherein each disk cartridge is mounted into a dedicated cartridge inserting opening, as to the recording reproducing device, a recording and reproducing device corresponding to each disk cartridge is needed as well.

Therefore, it is impossible to selectively mount disk cartridges having different sizes to a compatible recording and reproducing device.

That is, in the case of disk cartridges having different sizes, in some cases, the positions of positioning holes for positioning the disk cartridges onto a recording and reproducing device are different. Particularly in the case of a recording and reproducing device which frequently use a spindle motor, it is extremely difficult to match the positioning holes for the disk cartridges having different sizes. For example, in the case of using disk cartridges having different sizes, treatment of positioning pins at the recording and reproducing device side to be engaged with positioning holes of disk cartridges so as to be positioned can be troublesome. That is, since positioning pins of a disk cartridge having a small disk diameter are unnecessary at the time of inserting a disk cartridge having a large disk diameter, it should escape from the positioning pins. For example there is no avoiding measure in disk cartridges such as a floppy disk, an MD (mini disk), and an MO (magneto-optic disk) in consideration of use of disk cartridges having different sizes in one recording and reproducing device.

SUMMARY OF THE INVENTION

An object of the present invention is to obtain a disk cartridge device capable of selectively positioning and mounting a plurality of kinds of disk cartridges having different sizes onto one recording and reproducing device without troubles.

In order to achieve the above-mentioned object, a disk cartridge device according to the present invention comprises pairs of positioning pins for positioning disk cartridges having different sizes onto a recording and reproducing device, and positioning holes on one surface of the disk cartridges having different sizes, to be engaged with the pairs of the positioning pins so as to be positioned, wherein the position of the positioning holes of the disk cartridge having a small disk diameter is disposed outside the disk circumference of the disk cartridge having a large disk diameter.

According to the configuration, at the time of mounting a disk cartridge having a large disk diameter onto a recording and reproducing device, the disk can be escaped without interference with positioning pins for positioning the positioning holes of a disk cartridge having a small disk diameter, and thus the disk cartridges having different sizes can be mounted onto the recording and reproducing device without troubles.

DESCRIPTION OF THE PREFERRED EMBODIMENTS

Hereinafter, a case of adopting an embodiment of a disk cartridge device according to the present invention in two kinds of large and small disk cartridges having different disk diameters will be explained with reference to drawings.

Figure 1:
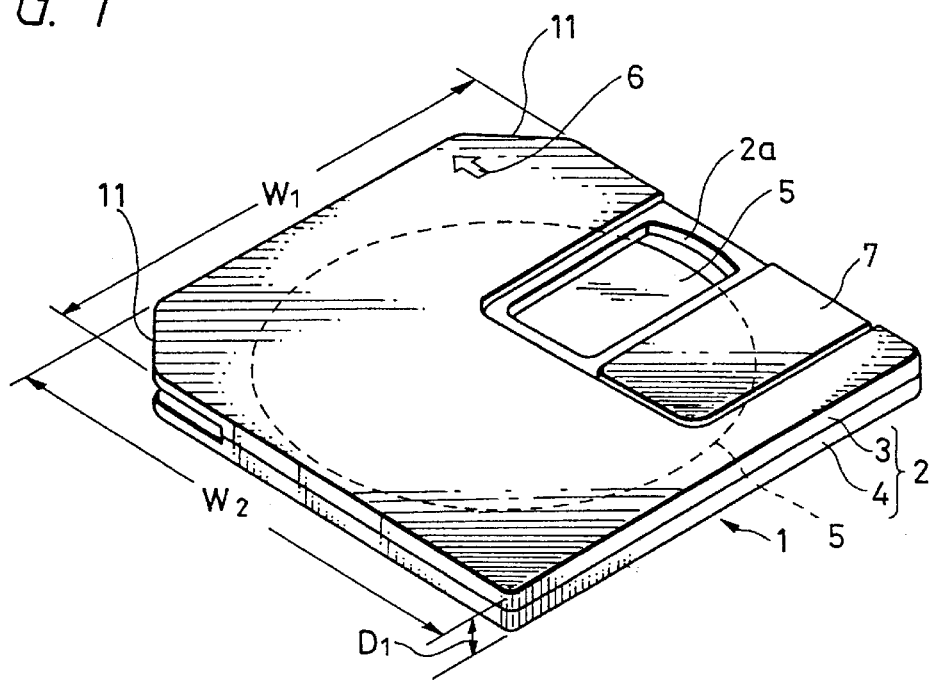
FIG. 1 is a perspective view of a large disk cartridge according to the present invention viewed from the upper surface.
Figure 2:
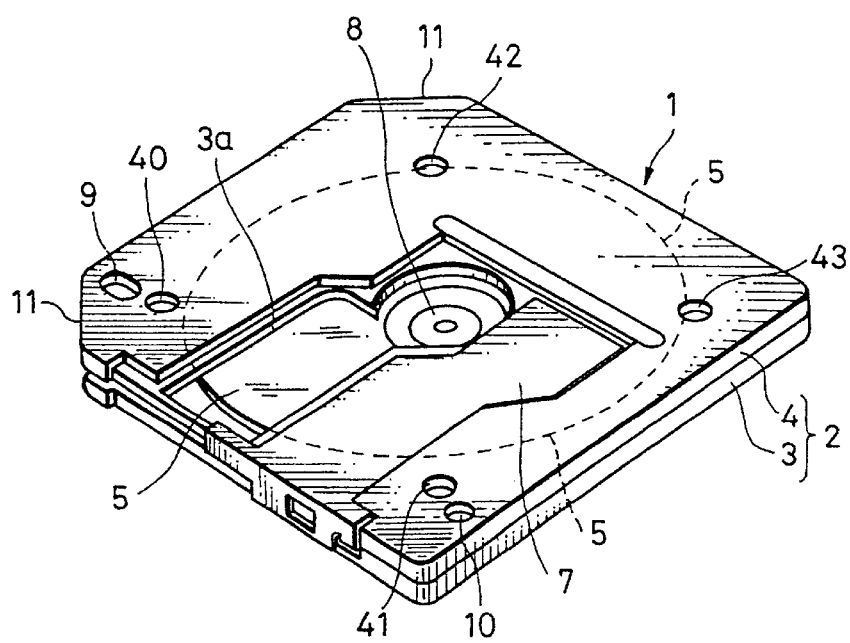
FIG. 2 is a perspective view of the same large disk cartridge viewed from the lower surface.
Figure 3:
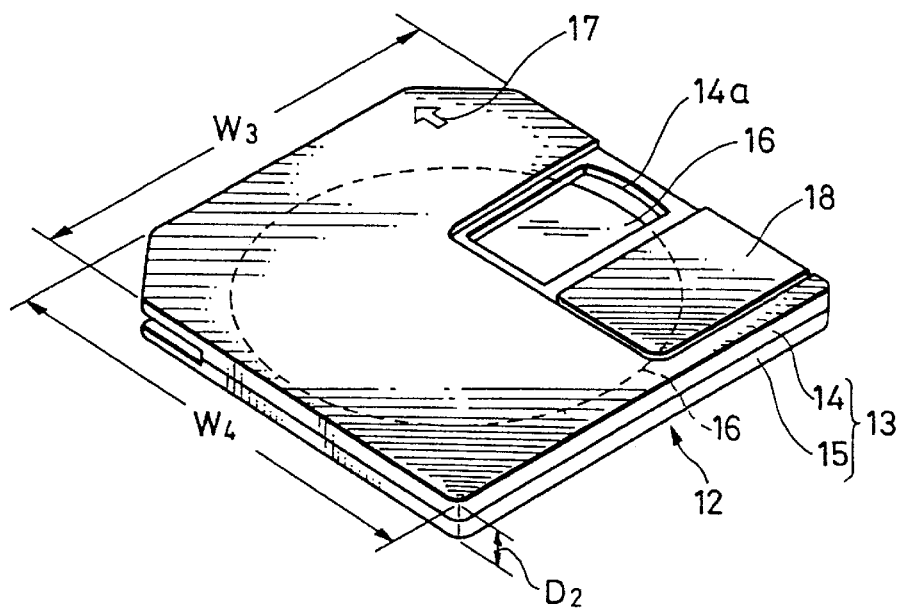
FIG. 3 is a perspective view of a small disk cartridge according to the present invention viewed from the upper surface.
Figure 4:
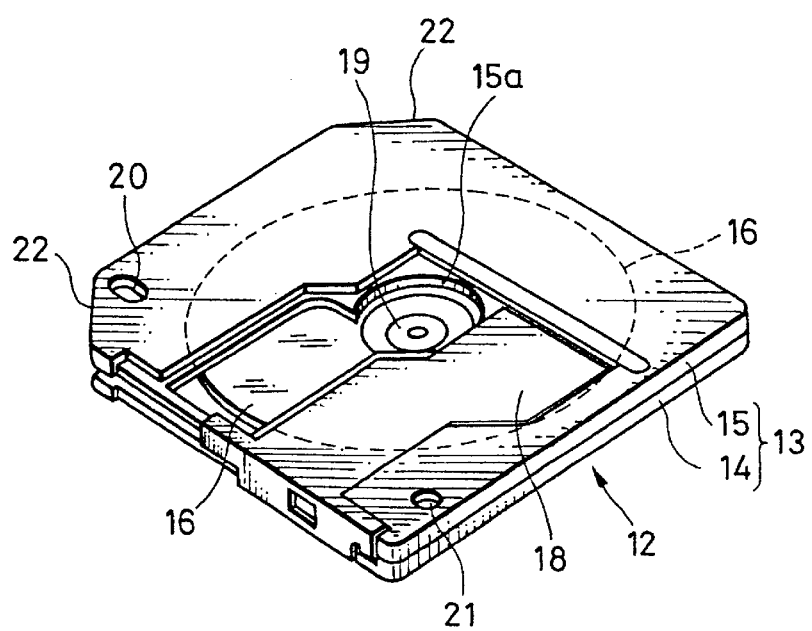
FIG. 4 is a perspective view of the same small disk cartridge viewed from the lower surface.

FIG. 1 is a perspective view of a disk cartridge having a large disk diameter (hereinafter referred to as a first disk cartridge) in the shutter release state, viewed from the upper surface side, FIG. 2 is a perspective view of the same in the shutter release state, viewed from the lower surface side, FIG. 3 is a perspective view of a disk cartridge having a small disk diameter (hereinafter referred to as a second disk cartridge) in the shutter release state, viewed from the upper surface side, and FIG. 4 is a perspective view of the same in the shutter release state, viewed from the lower surface side.

Numeral 1 represents the entirety of the first disk cartridge. A cartridge housing 2 is provided by the attachment system of the joint surface of an upper half 3 and a lower half 4 by high frequency welding. A disk 5 stored in the first disk cartridge 1 is, for example, an optical disk, with a disk outer diameter of, for example, 64.8 mm. In this case, the disk housing 2 has a standard size with the length $W_1$ of one side orthogonal to the disk cartridge 1 insertion direction (shown by the arrow marker 6) of 72 mm, the length $W_2$ of the other side orthogonal to this side of 68 mm, and the thickness D1 of 5 mm.

The above-mentioned first disk cartridge 1 comprises a shutter plate 7 capable of opening or closing both surfaces of the cartridge housing 2 by the sliding system. By releasing the shutter plate 7, a part of the upper surface of the disk 5 in the radial direction is exposed from an opening window 2a of the upper half 2 on the disk cartridge 1 upper surface side as well as a part of the lower surface (recording layer) of the disk 5 in the radial direction is exposed from an opening window 3a of the lower half 3 on the disk cartridge 1 lower surface side. By releasing the shutter plate 7, a chucking plate 8 of the disk 5 is exposed on the disk cartridge 1 lower surface side.

In the lower half 4 of the first disk cartridge 1, a long hole-like positioning hole 9 is formed on one side of the insertion tip end side as well as a round hole-like positioning hole 10 is formed on the opposite side with respect to the positioning hole 9 of the insertion rear end side. Furthermore, the insertion tip end sides of the first disk cartridge 1 are formed into relatively large notch surfaces 11, 11 with both corner parts cut obliquely.

In contrast, numeral 12 represents the entirety of the second disk cartridge. In this case, a cartridge housing 13 is also provided by the attachment system of the joint surface of an upper half 14 and a lower half 15 by high frequency welding. A disk 16 stored in the second disk cartridge 12 is an optical disk, with a disk outer diameter of, for example, 50 mm. In this case, the disk housing 13 has a standard size with the length $W_3$ of one side orthogonal to the disk cartridge 1 insertion direction (shown by the arrow marker 17) of 58 mm, the length $W_4$ of the other side orthogonal to this side of 53 mm, and the thickness $D_2$ of 4 mm.

The above-mentioned second disk cartridge 12 comprises a shutter plate 18 capable of opening or closing both surfaces of the cartridge housing 13 by the sliding system. By releasing the shutter plate 18, a part of the upper surface of the disk 16 in the radial direction is exposed from an opening window 14a of the upper half 14 on the disk cartridge 12 upper surface side as well as a part of the lower surface (recording layer) of the disk 16 in the radial direction is exposed from an opening window 15a of the lower half 15 on the disk cartridge 12 lower surface side. By releasing the shutter plate 18, a chucking plate 19 of the disk 16 is exposed on the disk cartridge 12 lower surface side.

In the lower half 15 of the second disk cartridge 12, a long hole-like positioning hole 20 is formed on one side of the insertion tip end side as well as a round hole-like positioning hole 21 is formed on the opposite side with respect to the positioning hole 20 of the insertion rear end side. Furthermore, the insertion tip end sides of the second disk cartridge 12 are formed into relatively large notch surfaces 22, 22 with both corner parts cut obliquely.

Figure 5:
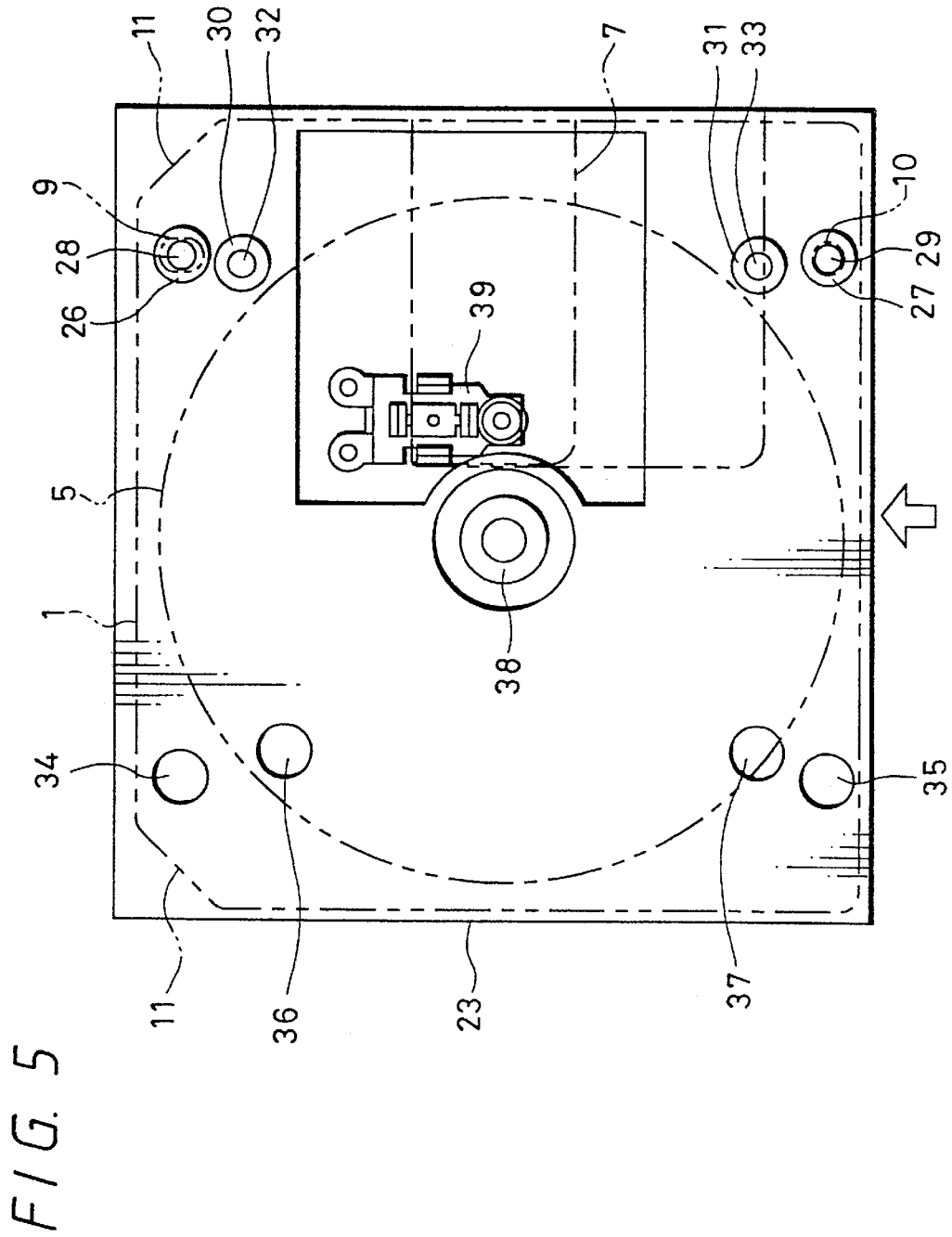
FIG. 5 is a plan view of the large disk cartridge loaded in a cassette compartment.
Figure 6:
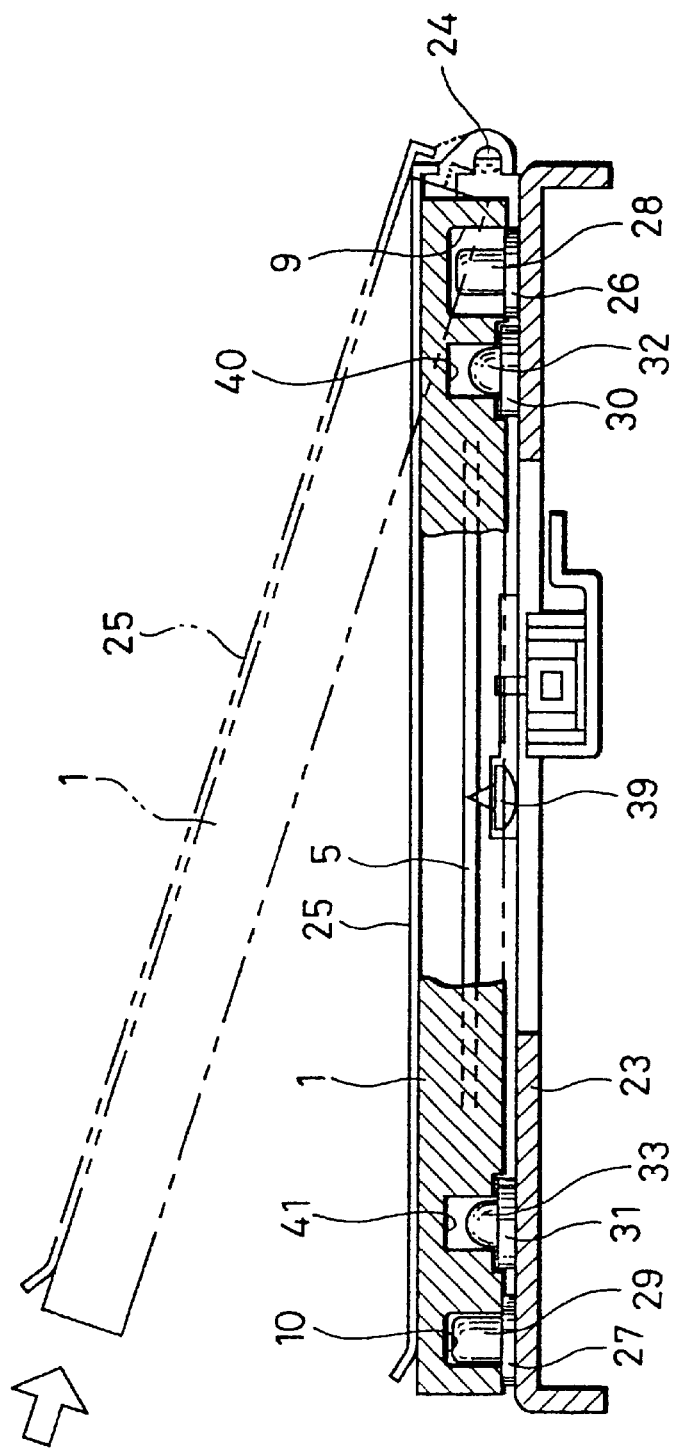
FIG. 6 is a cross-sectional view of the same large disk cartridge loaded in the cassette compartment.

Here, a plan view of a chassis 23 of a cassette compartment it a recording and reproducing device for mounting the above-mentioned disk cartridge is shown in FIG. 5, with the state having the first disk cartridge 1 loaded on the chassis 23 shown by an imaginary line, and a cross-sectional view with the first disk cartridge 1 positioned on the chassis 23 is shown in FIG. 6.

The first disk cartridge 1 is inserted into a holder 25 to be swung by the pop up system (spring up system) with a hinge part 24 serving as the fulcrum from the arrow direction. The holder 25 is swung to the chassis 23 side so as to be in the loaded position.

A pair of bases 26, 27 are formed on the hinge part 24 side on the chassis 23 and one side on the opposite side (right side) for determining the height of the first disk cartridge 1. Positioning pins 28, 29 are formed projecting from the bases 26, 27 so as to be respectively engaged with the positioning holes 9, 10 of the first disk cartridge 1.

A pair of bases 30, 31 are formed on the chassis 23 adjacent to the positioning pins 28, 29 at the inner side for determining the height of the second disk cartridge 12. Positioning pins 32, 33 are formed projecting from the bases 30, 31 so as to be respectively engaged with the positioning holes 20, 21 of the second disk cartridge 12.

In contrast, bases 34, 35 having the same height as the bases 26, 27 for determining the height of the first disk cartridge 1 are formed on the chassis 23 at a position symmetrical with respect to the right and left direction with the pair of the bases 26, 27 of the first disk cartridge 1. Bases 36, 37 having the same height as the bases 30, 31 for determining the height of the second disk cartridge 12 are formed on the chassis 23 adjacent to the bases 34, 35 at the inner side. The bases 30, 31, 36, 37 for determining the height of the second disk cartridge 12 are provided higher than the bases 26, 27, 34, 35 for determining the height of the first disk cartridge 1.

Moreover, in the above-mentioned chassis 23, a turn table 38 for chucking and rotating the disk 5 and an optical pickup device 39 for reproducing the recording information of the disk 5 or recording the recording information on the disk are disposed.

The first disk cartridge 1 loaded on the above-mentioned chassis 23 is positioned by engaging the pair of the positioning holes 9, 10 with the pair of the positioning pins 28, 29 of the chassis 23 as well as the height of the lower surface of the first disk cartridge 1 is determined by the bases 26, 27, 34, 35 so that the first disk cartridge 1 can be maintained in the horizontal state.

Here in the present invention, stepped escaping holes 40, 41 are formed for preventing interference of the first disk cartridge 1 with the pair of the positioning pins 32, 33 of the second disk cartridge 12 and the bases 30, 31. Moreover, escaping holes 42, 43 (see FIG. 2) are formed for preventing interference with the bases 36, 37 of the second disk cartridge 12. Accordingly, the disk cartridge 1 can be positioned stably without being interfered by the positioning pins 32, 33 of the second disk cartridge 12 and the bases 30, 31, 36, 37.

Figure 7:
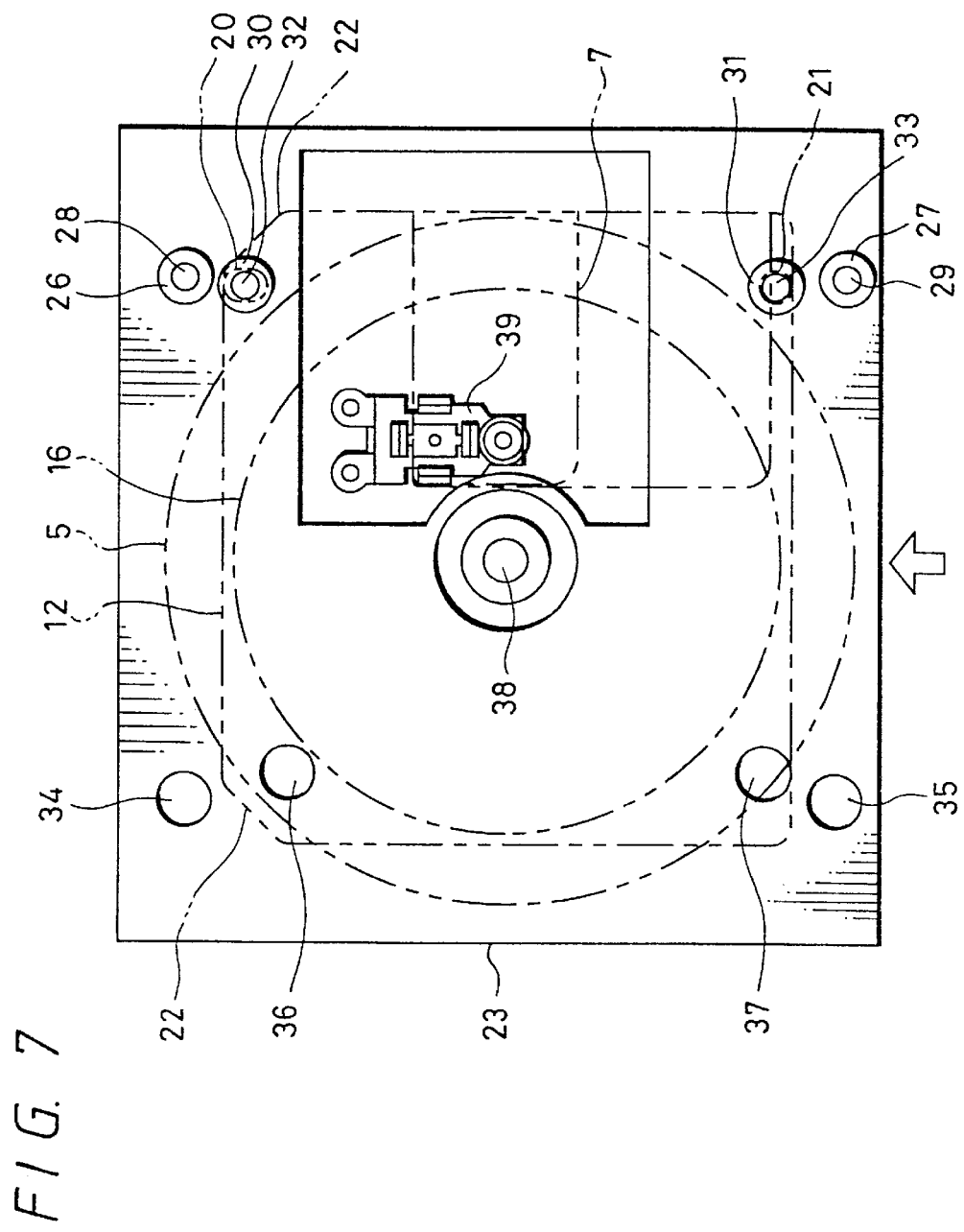
FIG. 7 is a plan view of the small disk cartridge loaded in the cassette compartment.
Figure 8:
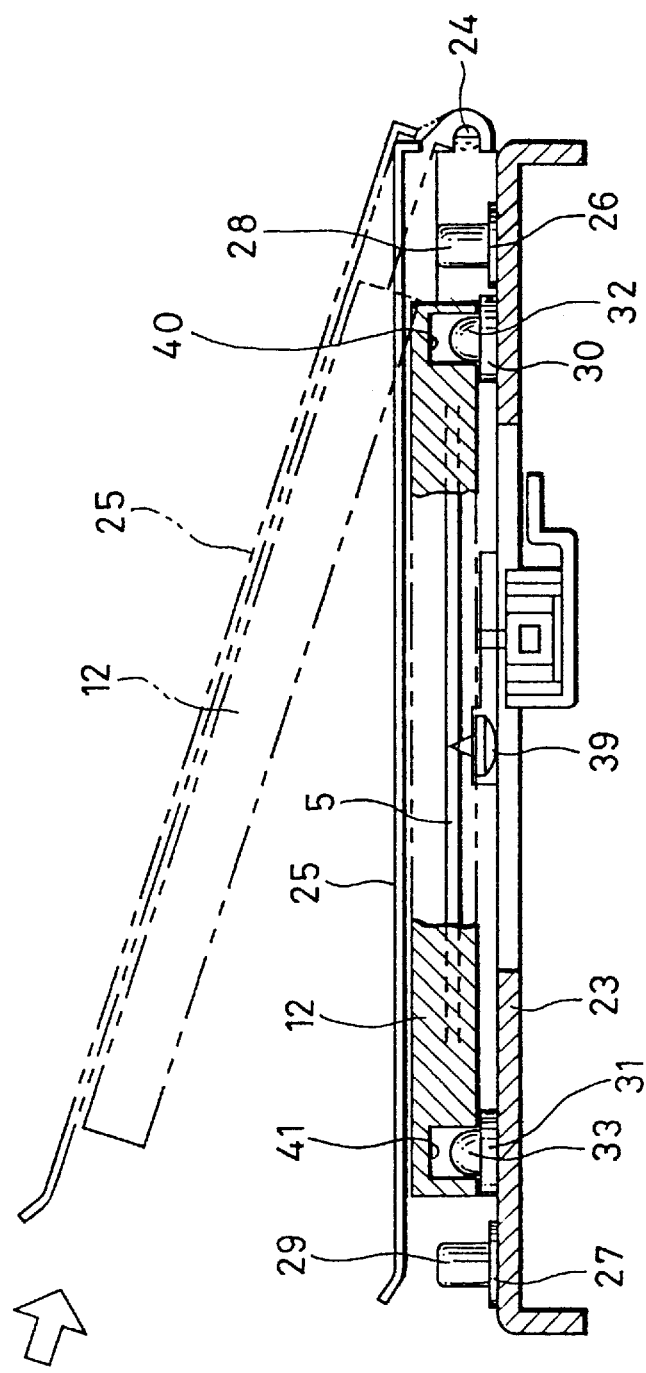
FIG. 8 is a cross-sectional view of the same small disk cartridge loaded in the cassette compartment.

The state with the second disk cartridge 12 loaded on the chassis 23 is shown in FIG. 7 by the imaginary line, and a cross-sectional view with the second disk cartridge 12 positioned on the chassis 23 is shown in FIG. 8.

The second disk cartridge 12 loaded on the chassis 23 is positioned by engaging the pair of the positioning holes 20, 21 with the pair of the positioning pins 32, 33 of the chassis 23 as well as the height of the lower surface of the second disk cartridge 12 is determined by the bases 30, 31, 36, 37 so that the second disk cartridge 12 can be maintained in the horizontal state.

Since the positioning pins 28, 29 of the first disk cartridge 1 and the bases 34, 35 are at a position not to be interfered with the second disk cartridge 12, in the state the second disk cartridge 12 is loaded on the chassis 23, a special escaping hole is not needed. What is important here is that the loading operation can be enabled without troubles to the first disk cartridge 1 by disposing the positioning pins 32, 33 of the second disk cartridge 12 outside the circumference of the disk 5 so as not to interfere with the disk 5 when the first disk cartridge 1 is loaded on the chassis 23.

The bases for determining the height of the second disk cartridge 12 are provided higher than the bases for determining the height of the first disk cartridge 1. The thickness of the housing 13 of the second disk cartridge 12 being slightly thinner, adjustment is made by the height of the bases, so that the spot of a light beam from the optical pickup device 39 can be radiated accurately to the recording layer of the disk 5 or 16.

As mentioned above, it is characteristic of the disk cartridge device according to the present invention that a two kinds of disk cartridges having different sizes can be selectively inserted into the cassette compartment for executing the recording or reproducing operation.

Moreover, since the escaping hole is provided in the first disk cartridge 1 for avoiding the interference with the positioning pins 32, 33 of the second disk cartridge 12 at the time of loading the first disk cartridge 1 as well as the position of the positioning pins 32, 33 of the second disk cartridge 12 is disposed outside the circumference of the disk 5 for preventing interference with the disk 5 at the time of loading the first disk cartridge 1 on the chassis 23, insertion of two kinds of disk cartridges having different sizes is enabled so that a highly reliable disk cartridge device can be provided.

Furthermore, since the notch surfaces 11, 22 are formed on both corner parts of each insertion side in the disk cartridges 1, 12, the insertion orientation of the disk cartridge can easily be recognized so as to prevent the insertion mistake. Moreover, even in the case the disk cartridge is inserted with the oblique posture at the time of inserting into the holder 25, the notch surfaces 11, 22 provide the guiding function so that the disk cartridge can be inserted into the holder 25 with the normal posture.

In inserting the disk cartridge into the holder 25, in the case of the large first disk cartridge 1, since the right and left side surfaces of the cartridge can be guided by the holder 25, it can be inserted into the accurate position without the need of providing a special guiding mechanism. In contrast, in the case of the small second disk cartridge 12, a guiding mechanism needs to be provided in the holder 25. In this case, the guiding mechanism can easily be realized by providing a mechanism for escaping at the time of inserting the large first disk cartridge 1 into the holder 25.

The present invention is not limited to the above-mentioned embodiment shown in the drawings, but various modifications can be adopted without departing from the scope of the gist thereof.

Although the case with the pair of the positioning pins disposed at the front and rear positions along the insertion direction of the disk cartridge has been explained in this embodiment, the same process as the above-mentioned case can be executed also in the case they are disposed on the right and left positions on the rear end side of the disk cartridge. In this case, a pair of the positioning pins may be round hole-like positioning pins.

Moreover, although the case adopted in the two kinds of the disk cartridges having different sizes has been explained in this embodiment, it can easily be realized also in disk cartridges of more than two kinds having different sizes by providing an escaping hole for the positioning pins at a position interfered by the cartridge, or by disposing the positioning pins at a position escaped from the disk.

Furthermore, the bases of the first and second disk cartridges may have the same height.

As heretofore explained, since a disk cartridge device according to the present invention comprises pairs of positioning pins for positioning disk cartridges having different sizes onto a recording and reproducing device, and positioning holes on one surface of the disk cartridges having different sizes, to be engaged with the pairs of the positioning pins so as to be positioned, wherein the position of the positioning holes of the disk cartridge having a small disk diameter is disposed outside the disk circumference of the disk cartridge having a large disk diameter, a highly reliable disk cartridge device can be provided without the need of providing a complicated mechanism on the recording and reproducing device side nor troubles in mounting a large disk cartridge.

Moreover, since the height of the base for the disk cartridge having a small disk diameter is set slightly higher than the height of the base for the disk cartridge having a large diameter, even in the case of disk cartridges having different thicknesses, the spot of a light beam from an optical pickup device can be radiated onto the recording layer of the disk accurately with a simple mechanism countermeasure.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A disk cartridge device comprising:
   a plurality of disk cartridges including disks having different disk diameters each stored in cartridge housings having different sizes;
   a recording and reproducing device with the plurality of disk cartridges having different sizes selectively mounted;
   pairs of positioning pins having a base for determining the height for positioning each of the disk cartridges having different sizes onto the recording and reproducing device; and
   positioning holes on one surface of the disk cartridges having different sizes, to be respectively engaged with the pairs of the positioning pins so as to be positioned;
   wherein the position of the positioning holes of the disk cartridge having a small disk diameter is disposed outside the disk circumference of the disk cartridge having a large disk diameter.

2. A disk cartridge device as claimed in claim 1,
   wherein at least a pair of stepped escaping holes for escaping the bases and positioning pins, which are used for determining the height of the disk cartridge having a small disk diameter, is provided outside the disk circumference of the disk cartridge having a large disk diameter.

3. A disk cartridge having a disk and a cartridge enclosing said disk, comprising:

a positioning aperture for accepting a first positioning pin provided in a disk recording/reproducing apparatus to be installed and positioning said cartridge relative to said disk recording/reproducing apparatus; and an escaping aperture for accepting a second positioning pin for escaping said second positioning pin without contacting said cartridge, the escaping aperture having a first escaping aperture portion extending from a surface of and into said cartridge at a first depth relative to the surface and a second escaping aperture portion extending from the surface of and into said cartridge at a second depth less than the first depth, the second escaping aperture portion surrounding the first escaping aperture portion.

4. The disk cartridge as cited in claim 3, wherein said escaping aperture is provided outside of an outer periphery of said disk.

5. The disk cartridge as cited in claim 3, wherein said escaping aperture is provided outside of an outer periphery of said disk and inside of said positioning aperture.

6. A disk cartridge for installation in a disk recording/reproducing apparatus having a chassis with a first positioning pin and a second positioning pin spaced apart from the first positioning pin fixedly mounted to the chassis, the disk cartridge comprising:

a cartridge housing; and a disk rotatably mounted in the cartridge housing and having a diameter not to contact with the first and second positioning pins provided in the disk recording/reproducing apparatus when the disk cartridge is installed, the first positioning pin having an inner portion projecting from the disk recording/reproducing apparatus at a first height and an outer portion projecting from the disk recording/reproducing apparatus at a second height smaller than the first height, the outer portion surrounding the inner portion, wherein the cartridge housing includes a first positioning aperture and a second positioning aperture spaced apart from the first positioning aperture, the first positioning aperture having a pin receiving aperture portion sized to accept the inner portion of the first positioning pin and a step-down aperture portion surrounding the pin receiving aperture portion and sized to receive the outer portion of the first positioning pin, the second positioning aperture sized to accept the second positioning pin, wherein said first positioning pin and said second positioning pin are positioned outwardly relative to a periphery of the disk.

7. A disk recording/reproducing apparatus selectively installed with a first disk cartridge and a second disk cartridge including disks having different disk diameters each stored in cartridge housings having different sizes, the first disk cartridge having a first disk cartridge positioning aperture and a first disk cartridge positioning step-down aperture disposed apart from the first disk cartridge positioning aperture and the second disk cartridge having a second disk cartridge positioning aperture, the disk recording/reproducing apparatus comprising:

a chassis;

a turn table operably connected to the chassis;

an optical pickup operably connected to the chassis;

a first positioning pin mounted to the chassis to be engaged with either the first disk cartridge positioning step-down aperture provided on said first disk cartridge for positioning therewith or the second disk cartridge positioning aperture on said second disk cartridge for positioning therewith; and a second positioning pin mounted to the chassis to be engaged with only the first disk cartridge positioning aperture provided on said first disk cartridge for positioning therewith, wherein said first positioning pin and said second positioning pin are positioned at a position outwardly relative to a periphery of the respective disks.

8. The disk/reproducing apparatus as cited in claim 7, wherein said second positioning pin is positioned inwardly of said first positioning pin relative to the periphery of the respective disks.

* * * * *